US010151404B2

(12) United States Patent
Robson

(10) Patent No.: US 10,151,404 B2
(45) Date of Patent: *Dec. 11, 2018

(54) OFF-AXIS POSITION MONITORING AND CONTROL SYSTEM AND RELATED METHODS

(71) Applicant: Flow Control Industries, Inc., Woodinville, WA (US)

(72) Inventor: Christopher J. Robson, Renton, WA (US)

(73) Assignee: Flow Control Industries, Inc., Woodinville, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/156,074

(22) Filed: May 16, 2016

(65) Prior Publication Data
US 2016/0334030 A1 Nov. 17, 2016

Related U.S. Application Data

(63) Continuation of application No. 14/038,674, filed on Sep. 26, 2013, now Pat. No. 9,341,282.

(60) Provisional application No. 61/868,005, filed on Aug. 20, 2013.

(51) Int. Cl.
F16K 37/00 (2006.01)
F16K 5/04 (2006.01)
G01D 5/14 (2006.01)
F24F 11/84 (2018.01)

(52) U.S. Cl.
CPC ............ F16K 37/0033 (2013.01); F16K 5/04 (2013.01); G01D 5/145 (2013.01); *F24F 11/84* (2018.01); *Y10T 137/8242* (2015.04)

(58) Field of Classification Search
CPC .................. F16K 37/0033; G05D 7/0635
USPC ..................................... 137/554; 251/129.04
See application file for complete search history.

(56) References Cited

U.S. PATENT DOCUMENTS 5,099,867 A * 3/1992 Emery ................. F16K 31/045
137/1
6,098,646 A * 8/2000 Hennemann ............ A47L 15/44
137/101.19
7,032,617 B2 * 4/2006 Kurita ..................... F02D 9/105
137/554

(Continued)

Primary Examiner — Marina Tietjen
Assistant Examiner — Paul J Gray
(74) Attorney, Agent, or Firm — Perkins Coie LLP

(57) ABSTRACT

A flow control valve and a valve-position monitoring and control system coupled to the valve member and configured to precisely determine valve conditions related to the rotary position of the valve member. The system has an array of spaced apart transducers in an arcuate arrangement and in a fixed, non-moveable position relative to the valve's housing. A magnetic-field source is fixed to and rotates with the valve member as a unit. The magnetic-field source includes magnetic members adjacent to and out of physical engagement with the transducers. The magnetic member moves along an arcuate path parallel to the arcuate arrangement of the transducers as the valve member rotates through the plurality of rotary positions. The magnetic-field source provides magnetic flux detectable by at least a plurality of the transducers to precisely determine the rotational position of the magnetic-field source and/or the valve member, and the fluid flow rate through the control valve.

20 Claims, 13 Drawing Sheets

(56) References Cited

U.S. PATENT DOCUMENTS 7,784,490 B1 * 8/2010 Stewart .................. B63B 13/02
137/554
8,192,172 B2 * 6/2012 Baker .................... F02C 7/232
137/554

* cited by examiner

OFF-AXIS POSITION MONITORING AND CONTROL SYSTEM AND RELATED METHODS

CROSS REFERENCE TO RELATED APPLICATION

The present application is a continuation patent application that claims the benefit of and priority to U.S. patent application Ser. No. 14/038,674 titled OFF-AXIS POSITION MONITORING AND CONTROL SYSTEM AND RELATED METHODS, and filed Sep. 26, 2013, and U.S. Provisional Patent Application No. 61/868,005, titled OFF-AXIS POSITION MONITORING AND CONTROL SYSTEM AND RELATED METHODS, and filed Aug. 20, 2013, which is incorporated herein by reference thereto.

TECHNICAL FIELD

The present technology is related to off-axis position monitoring and control system and related methods.

BACKGROUND

Many mechanisms are dependent upon the physical positioning of a movable component relative to another fixed, non-movable component of the mechanism. For example, flow control valves are used extensively to control fluid flow in heating and cooling systems used to control thermal loads in, as an example, buildings or other spaces. Performance of the valves, and thus the systems, are typically highly dependent upon the accuracy of identifying and controlling the positioning of the valve member within the housing of the flow control valve. More specifically, pressure independent control valves, such as the DeltaPValve®, manufactured by Flow Control Industries, Inc. of Woodinville, Wash., have been used to provide dramatic improvements in performance of the systems. Such pressure independent control valves are disclosed in, as an example, U.S. Pat. Nos. 4,893,649, 5,143,116, 7,128,086, and other patents issued to inventor Paul Skoglund, all of which are incorporated herein by reference thereto. These valves typically have a valve stem rotatable about an axis of rotation to control the valve position and the associated flow of fluid through the valve. In many applications it can be very advantageous to determine, monitor and control the rotational position of the valve stem and associated valve position. Conventional position detection systems are connected to the top of the valve stem in an axial aligned orientation so as to engage and measure the rotational movement of the valve stem. These position detection systems atop the valve stem typically have accuracy limitations, and many valve installations are not conducive to an axially aligned detection system connected to the top of the valve stem. There is a need for improved control and accurate monitoring of the valves, which can be used to further improve performance of the systems in which the valves are installed.

SUMMARY

The present technology provides off-axis position monitoring and control systems and related methods. Embodiments can provide non-contact, off-axis position monitoring systems that can be uses with flow control valves and related control systems that overcome drawbacks in the prior art. One aspect of the present technology provides a control valve assembly comprising a valve housing, and a valve member rotationally moveable relative to the valve housing between a plurality of rotary positions of the valve member. The valve member has a valve body rotatably contained in the housing and a valve stem connected to the valve body. A valve-position monitoring and control system is coupled to the valve member and configured to precisely determine valve conditions related to the rotary position of the valve member. The valve-position monitoring and control system has a transducer array assembly having a plurality of spaced apart transducers arranged in an arcuate arrangement and being in a fixed, non-moveable position relative to the valve housing. The transducers can be Hall effect sensors. A magnetic-field source is fixed to the valve member and is rotatable with the valve member as a unit. The magnetic-field source includes at least one magnetic member adjacent to the array assembly and out of physical engagement with the transducers. The magnetic member is moveable along an arcuate path substantially parallel to the arcuate arrangement of the transducers as the valve member rotates through the plurality of rotary positions. The magnetic-field source provides magnetic flux detectable by at least a plurality of the transducers to precisely determine at least one of the rotational position of the magnetic-field source, the rotational position of the valve member, and a rate of flow through the control valve assembly.

In some aspects of the disclosure, the valve housing and valve member can be components of a pressure independent flow control valve. The transducer array assembly can have a mounting portion fixable relative to the housing, a support plate carried by the mounting portion, and a plurality of transducers attached to the support plate in the arcuate arrangement. The transducers can be arranged along a partially circular path, and wherein each transducer is an equal distance from an axis of rotation of at least a portion of the valve member. The transducer array can have opposing first and second surfaces, and the magnetic-field source can have a first portion with a first magnetic field member positioned immediately adjacent to and out of engagement with the first surface of the transducer array. The magnetic-field source can have a second portion with a second magnetic field member aligned with the first magnetic field member and positioned immediately adjacent to and out of engagement with the second surface of the transducer array, and wherein the magnetic-field source is positionable so at least one transducer is positioned between the first and second magnetic-field sources.

The magnetic-field source can have a U-shaped member with a first magnet on a first leg and a second magnet on a second leg and aligned with the first magnet. The magnetic-field source can have opposing first and second magnets at least partially encased in an overmold portion and positioned so the transducers will move between the first and second magnets as the valve member moves through the plurality of rotary positions. The control valve assembly can have a controller operatively connected to the transducer array and configured to receive signals from the transducers related to the magnetic field detected by one or more transducers, wherein the signals are useable to precisely determine the rate of flow through the control valve assembly.

In another embodiment, a control valve assembly has a valve housing and a valve member that has a valve body rotatably contained in the housing and a valve stem connected to the valve body. The valve member is rotatably carried by the housing and is rotationally moveable between a plurality of rotary positions of the valve member. A valve-position monitoring and control system is coupled to the valve member and is configured to precisely determine valve conditions related to rotary positions of the valve member. The valve-position monitoring and control system has a first portion coupled to the valve housing and is in a fixed, non-moveable position relative to the valve housing. A second portion is spaced apart from the first portion and is connected to the valve member, wherein the second portion is rotatable with the valve member as a unit relative to the valve housing. A first one of the first and second portions comprises a transducer array assembly having a plurality of spaced apart transducers positioned in a planar and arcuate arrangement. A second one of the first and second control portions has a magnetic-field source that includes at least one magnetic member immediately adjacent to the transducer array assembly and spaced apart from and out of physical engagement with the transducers. The magnetic member is moveable along an arcuate path substantially parallel to the arcuate arrangement of the transducers as the valve member rotates through the plurality of rotary positions, wherein the magnetic-field source provides magnetic flux detectable by at least a plurality of the transducers to precisely determine at least one of the rotational positions of the magnetic-field source, the rotational position of the valve member, and a rate of flow through the control valve assembly.

Another aspect of the disclosure provides a position monitoring and control system usable with a mechanism having a first portion and a second portion movable relative to the first portion between a plurality of rotary or linear positions. The position monitoring and control system has a transducer array assembly with a plurality of spaced apart transducers arranged in a spaced apart arrangement, which may be an arcuate arrangement. The transducers being in a fixed, non-moveable position relative to the first portion of the mechanism. A magnetic-field source is fixed to the second portion and is movable as a unit with the second portion of the mechanism. The magnetic-field source has at least one magnetic member adjacent to the array assembly and out of physical engagement with the transducers. The magnetic member is moveable along a selected path, such as an arcuate or linear path substantially parallel to the spaced apart arrangement of the transducers as the second portion of the mechanism rotates or otherwise moves through the plurality of positions. The magnetic-field source provides magnetic flux detectable by at least a plurality of the transducers to precisely determine the relative position of the magnetic-field source, the relative position of the second portion of the mechansim, or a characteristic of the mechanism's performance based upon the position data of the first mechanism relative to the second mechanism.

BRIEF DESCRIPTION OF THE DRAWINGS

Many aspects of the present technology can be better understood with reference to the following drawings. The components in the drawings are not necessarily to scale. Instead, emphasis is placed on illustrating clearly the principles of the present technology. In addition, directional terms, such as "above," "below," "lower," "front," "back," "vertical," and "horizontal," may be used herein to express and clarify the relationship between various elements. It should be understood that such terms do not denote absolute orientation.

DETAILED DESCRIPTION

The present disclosure provides control and monitoring systems, and in particular off-axis position monitoring and control system and related methods that overcomes drawbacks experienced in the prior art. The present disclosure describes for purposes of illustration an off-axis position monitoring and control system coupled with a flow control valve assembly in accordance with certain embodiments of the present invention. Several specific details of one or more embodiments are set forth in the following description and the Figures to provide a thorough understanding of certain embodiments of the invention. One skilled in the art, however, will understand that the present invention may have additional embodiments, and that other embodiments of the invention may be practiced without several of the specific features described below. Further, other embodiments provide control and monitoring systems for use with mechanisms having a first component and a second component movable relative to the first mechanism along a selected rotary, linear, or other defined path.

Figure 1:
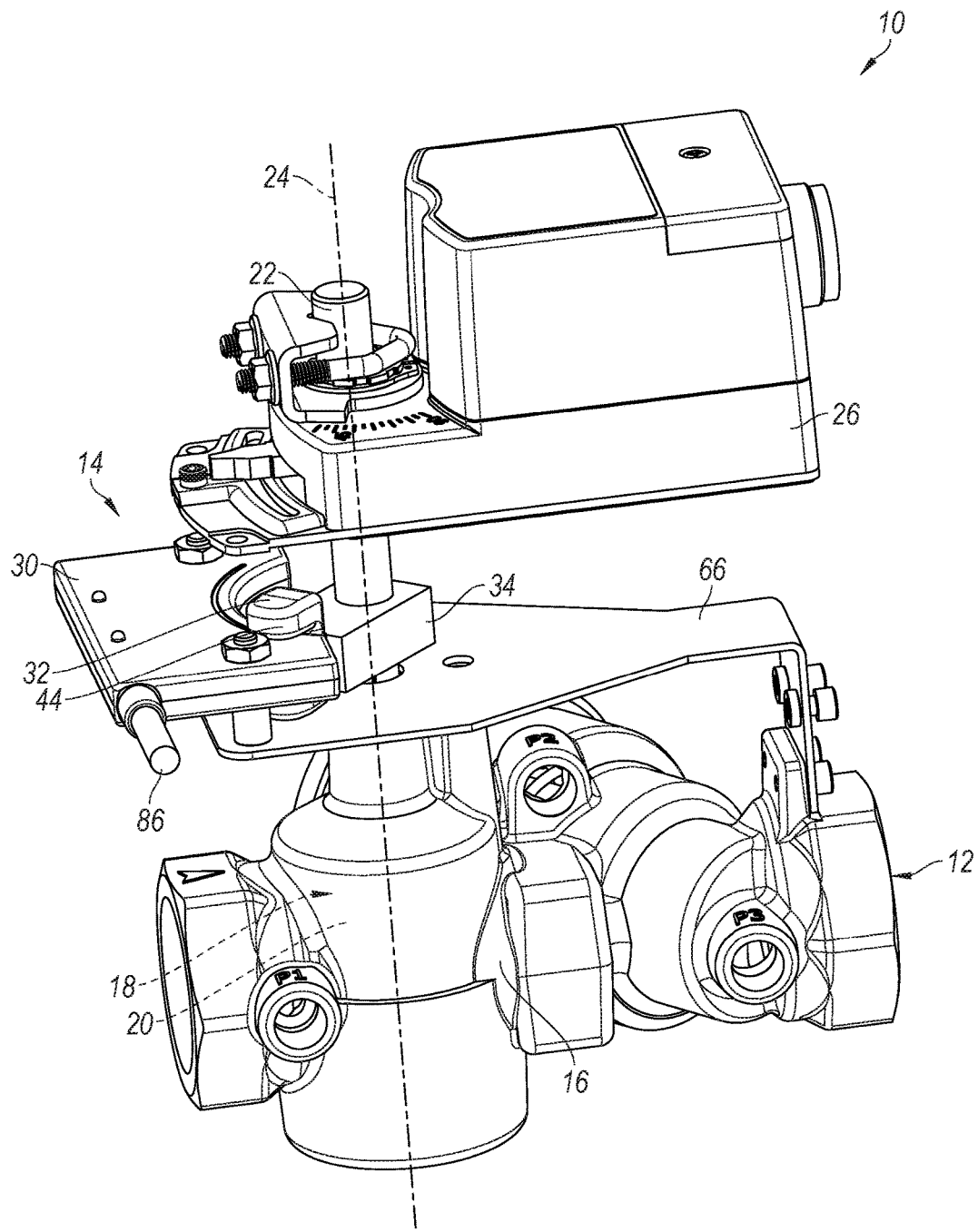
FIG. 1 is an isometric view of a position monitoring and control system in accordance with aspects of the current disclosure installed on a valve assembly with a pressure independent flow control valve having a BTU meter assembly coupled to the valve stem.
Figure 2:
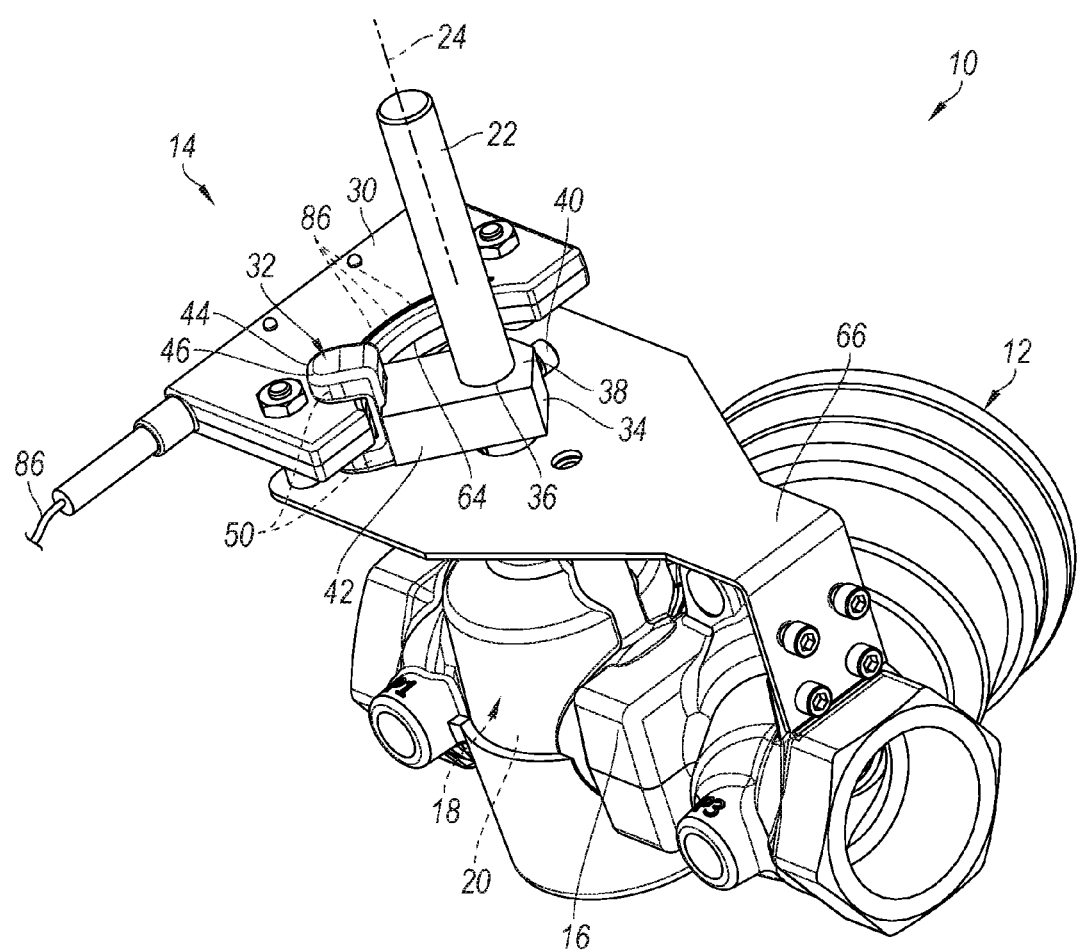
FIG. 2 is an isometric view of the position monitoring and control system and valve assembly of FIG. 1 with a BTU meter removal from the valve stem.
Figure 3:
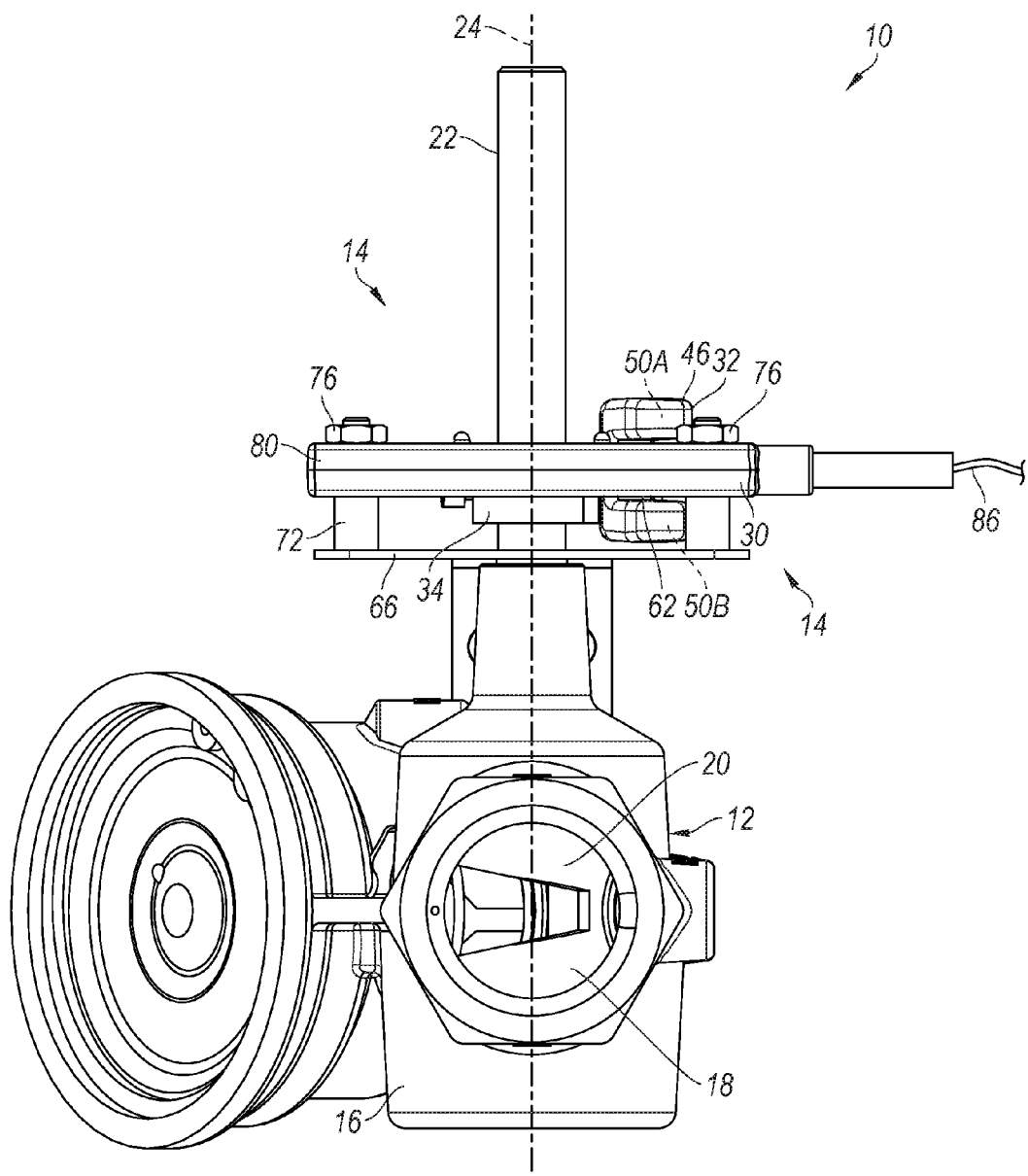
FIG. 3 is a front elevation view of the position monitoring and control system and valve assembly of FIG. 2.
Figure 4:
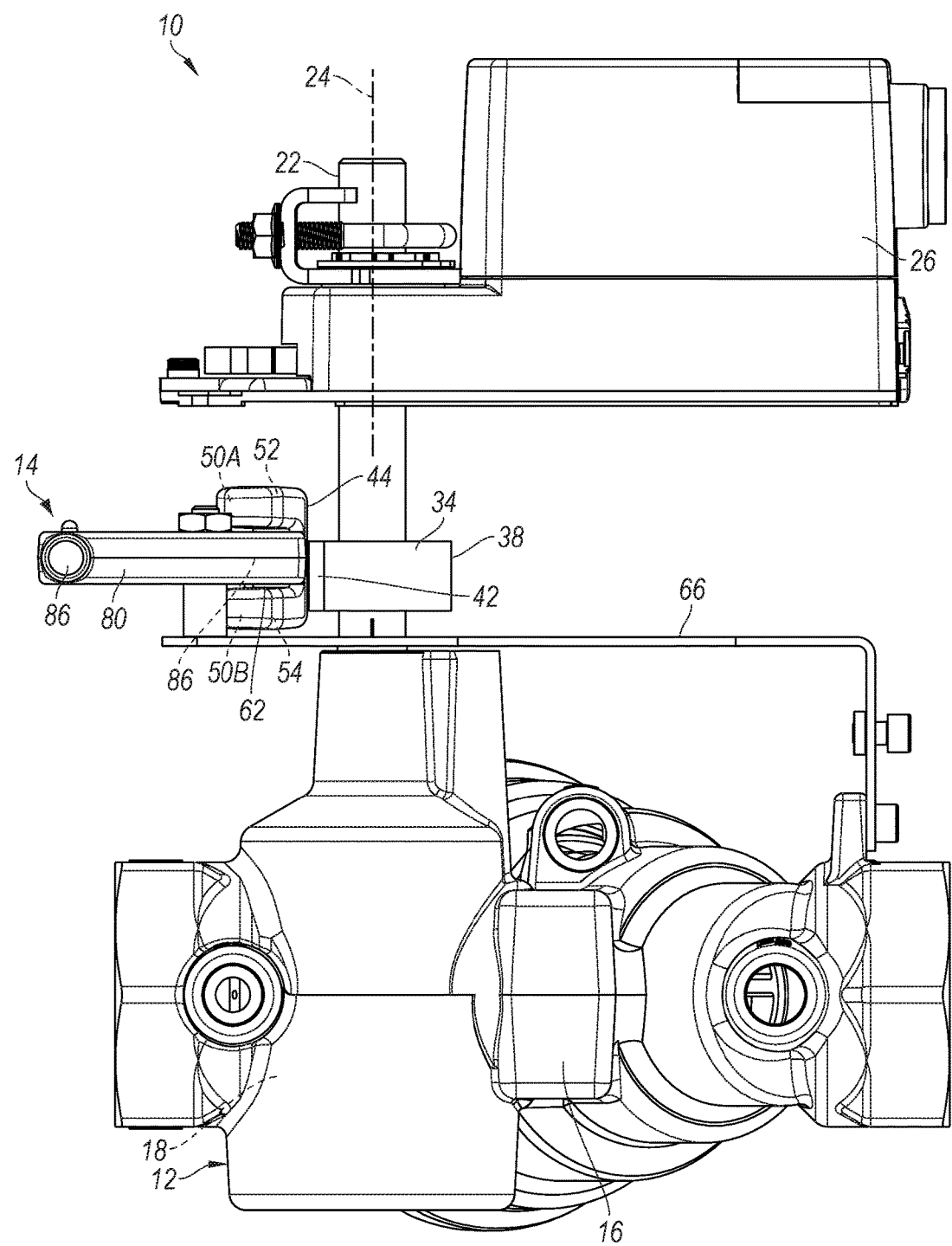
FIG. 4 is a side elevation view of the position monitoring and control system and valve assembly of FIG. 1 with the BTU meter on the valve stem.

FIG. 1 is an isometric view of control valve assembly 10 with a flow control valve 12 having an off-axis position monitoring and control system 14 in accordance with at least one embodiment. The control valve 12 has a valve housing 16 with a flow inlet and outlet, and a valve member 18 having a valve body 20 rotatably positioned in the housing 16. A valve stem 22 is attached to the valve body 20 and it projects from the valve housing 16. The valve body 20 and valve stem 22 are axially aligned and rotatable about an axis of rotation 24 relative to the valve housing 16 between a plurality of rotational positions. The flow control valve 12 is configured to control a flow rate of fluid through the valve. In the illustrated embodiment, the control valve 12 is a pressure independent control valve, such as a DeltaPValve® manufactured by Flow Control Industries of Woodinville, Wash. The fluid flow rate through the pressure independent flow control valve 12 can be very precisely controlled by carefully and accurately determining and controlling the rotational position of the valve body 20 within the valve housing 16. The flow control valve 12 illustrated in FIG. 1 has a BTU meter assembly 26 fixed atop the valve stem 22. FIG. 2 illustrates the flow control valve 12 without the BTU meter assembly 26. The BTU meter assembly 26 and the flow control valve 12 can be configured for use, for example, in an energy consumption monitoring system as disclosed in U.S. patent application Ser. No. 13/440,842, titled Pressure Compensated Flow Rate Controller with BTU Meter, which is incorporated herein in its entirety by reference. Precise adjustments of the flow control valve 12 can directly relate in more accurate and effective performance of the BTU meter assembly 26.

In the illustrated embodiment and as shown in FIGS. 1-5, the position or setting of the valve member 18 within the housing 16 is monitored and controlled by the off-axis position-monitoring and control system 14. The monitoring/control system 14 of the illustrated embodiment utilizes a plurality of off-axis sensors used to very accurately determine the exact rotational position of the valve body 20, which corresponds to the exact flow rate through the flow control valve 12. The system 14 is also configured to allow for precise control of the valve member 18 and associated flow rate through the flow control valve 12 for improved performance and efficiency of the HVAC or other fluid system in which the flow control valve assembly 10 is installed.

The monitoring/control system 14 has a sensor array assembly 30 mounted in a fixed position relative to the valve housing 16 and adjacent to the valve stem 22. The system 14 also has a magnetic-field source 32 fixed to the valve member 18, such as at the valve stem 22. Accordingly, the magnetic-field source 32 and the valve member 18 rotate together as a unit relative to the sensor array assembly 30 and the housing 16. The magnetic-field source 32 in the illustrated embodiment does not physically engage the sensor array assembly 30, such that the interaction between the magnetic-field source 32 and the sensor array assembly 30 provides no additional resistance to rotation of the valve stem 22 or other operation of the flow control valve 12.

Figure 5:
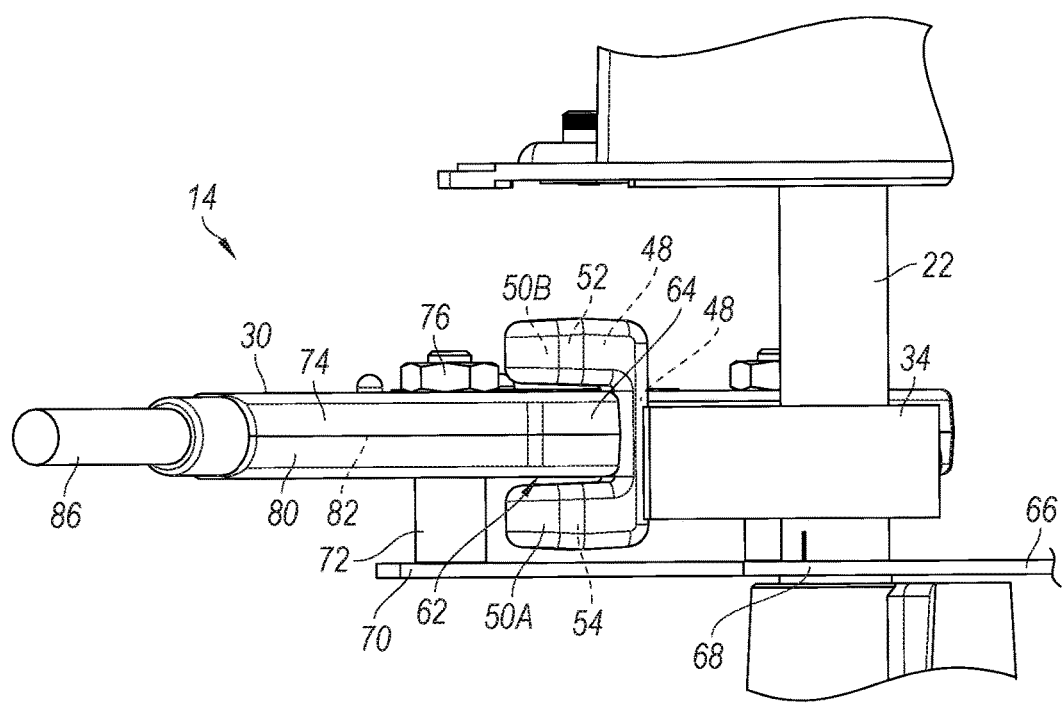
FIG. 5 is an enlarged elevation view of the position monitoring and control system of FIG. 1.

As shown in FIGS. 1, 2, and 5, the magnetic-field source 32 has a mounting member 34 securely fixed to the valve stem 22 at a selected position above or away from the housing 16. The mounting member 34 of the illustrated embodiment has an aperture 36 in its proximal end 38 that receives the cylindrical valve stem 22. A set screw 40 extends through the mounting member 34 and locks the mounting member 34 in a selected fixed position on the valve stem 22. The set screw 40 and mounting member 34 are configured to allow for adjustment of the axial and radial position of the magnetic-field source 32 relative to the valve stem 22 as needed, and then these components are fixed into the selected position relative to the flow control valve 12.

Figure 11:
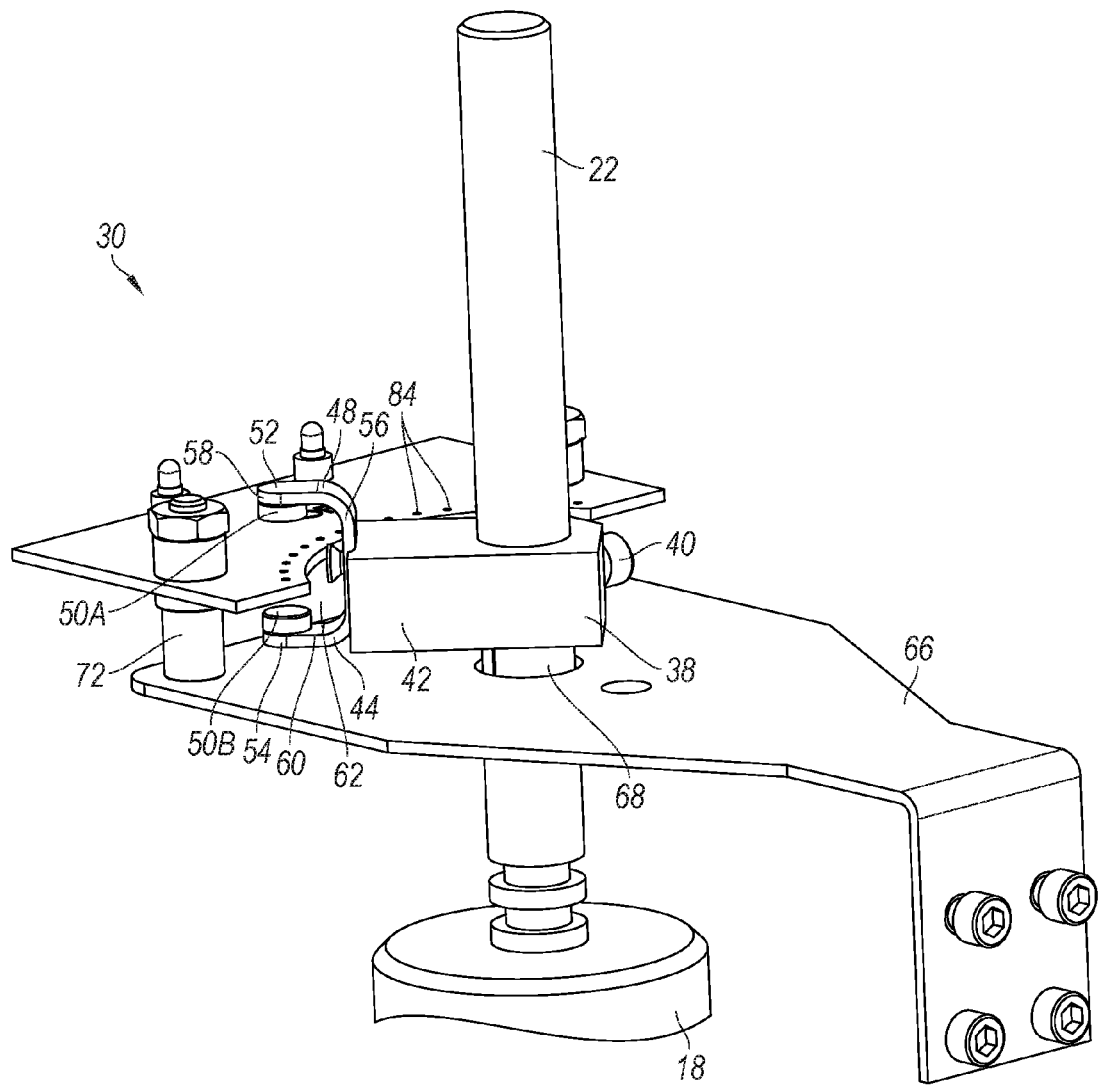
FIG. 11 is a top isometric view of the position, monitoring and control system of FIG. 10 with the overmolding shown removed from the sensor array assembly and from the magnet support member.

The free distal end 42 of the mounting member 34 is connected to a U-shaped magnet holder 44 positioned to sweep through an arcuate path positioned away from the valve stem yet being centered substantially at the axis of rotation 24 of the valve member 18. The magnet holder 44 of the illustrated embodiment has an overmolding layer 46 of plastic or other nonconductive material that encases a U-shaped bracket 48 and a pair of spaced apart magnets 50. As best seen in FIG. 11, the U-shaped bracket 48 has parallel top and bottom leg portions 52 and 54 interconnected by a web portion 56 mounted to the distal end 42 of the mounting member 34. The U-shaped bracket 48 is a metallic, Ferrous material, such as steel, Ferrous metal alloys, or the like, that acts as a path for the magnetic flux from the opposing magnets 50. The bracket 48 can be configured to shield the sensors in the sensor array assembly 30 from stray magnetic fields, thereby improving position accuracy of the mounting/control system 14.

Figure 12:
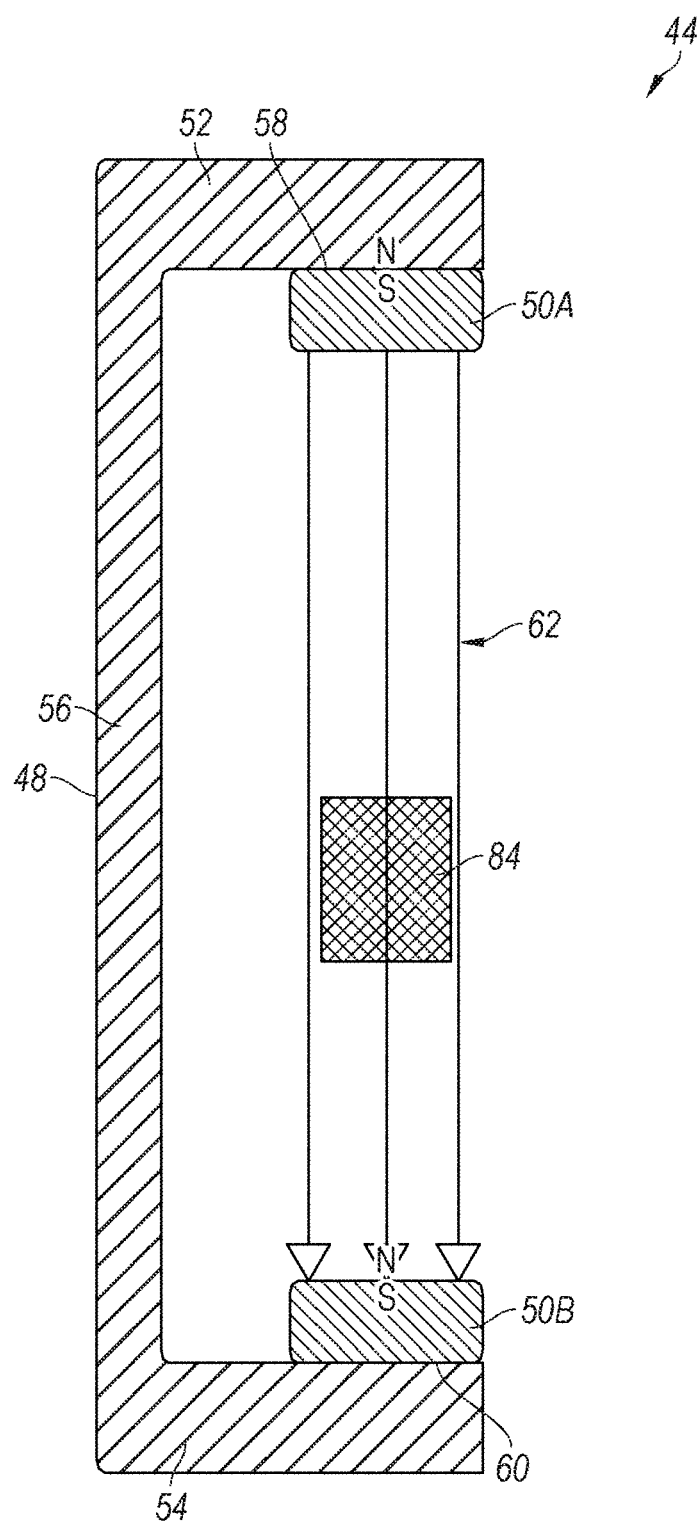
FIG. 12 is a schematic view of the magnet support member and sensor array assembly and an illustration of detectable magnetic flux therebetween.

The opposing magnets 50 include an upper magnet 50A attached to the inner surface 58 of the top leg portion 52 that faces the bottom leg portion 54. A lower magnet 50B is attached to the inner surface 60 of the bottom leg portion 54 that faces the top leg portion 52, such that the upper and lower magnets 50A and 50B are directly aligned with each other with an air gap 62 therebetween. The upper and lower magnets 50A and 50B are configured in an attracting manner such that the magnetic flux extends across the air gap 62 from one magnet to the other and returns through the Ferrous-based U-shaped bracket 48, such as is schematically shown in FIG. 12.

The air gap 62 between the top and bottom leg portions 52 and 54 is sized to receive an arcuate edge portion 64 of the sensor array assembly 30 therebetween, so the upper and lower magnets 50A and 50B are on opposing sides of the arcuate edge portion 64 (and the associated transducers, as discussed in greater detail below) without physical contact therebetween. Although the illustrated embodiment utilizes the overmolded U-shaped magnet holder 44 with a pair of magnets therein, other embodiments can provide one or more magnet holders having other configurations that support magnetic members adjacent to and out of engagement with the sensor array assembly 30 while allowing the magnet field source 32 to move through its arcuate path adjacent to the sensors in the sensor array assembly 30. Further, the illustrated embodiment utilizes permanent magnets, such as rare earth magnets, although other embodiments can use other magnets that provide accurately measurable magnetic flux or fields detectable by sensors, such as transducers, Hall effect sensors, or the like.

The sensor array assembly 30 of the illustrated embodiment is supported in a fixed, non-moveable position relative to the housing 16, such that rotation of the valve stem 22 will move the magnet holder 44 along its arcuate path relative to the sensor array assembly 30. The senor array assembly 30 of the illustrated embodiment is securely connected to the housing 16 by a mounting plate 66 rigidly attached to the valve housing 16. The mounting plate 66 can also rest on or otherwise rigidly connect to one or more portions of the housing 16 so as to provide a stable platform that supports the sensor array assembly 30 in a fixed position. In the illustrated embodiment, the mounting plate 66 has an aperture 68 through which the valve stem 22 extends, such that the mounting plate 66 does not interfere with rotation, or any other operation of the valve member 18.

The sensor array assembly 30 is fixed to an edge portion 70 of the mounting plate 66 at two or more connection points. The illustrated array sensor assembly 30 has a pair of standoffs 72 that position a body portion 74 of the sensor array assembly 30 apart from the mounting plate's edge portion 70. A pair of fasteners 76 rigidly interconnect the body portion 74 to the mounting plate 66, such that the arcuate edge portion 64 of the body portion 74 is facing the magnet holder 44 and the valve stem 22. Although the illustrated embodiment utilizes a mounting plate 66 and standoffs 72 to position the sensor array assembly 30 in a selected position relative to the valve stem 22 and associated magnet holder 44, other embodiments can provide other interconnection structures to position the sensor array assembly 30 in the fixed location adjacent to the U-shaped magnet holder 44.

Figure 6:
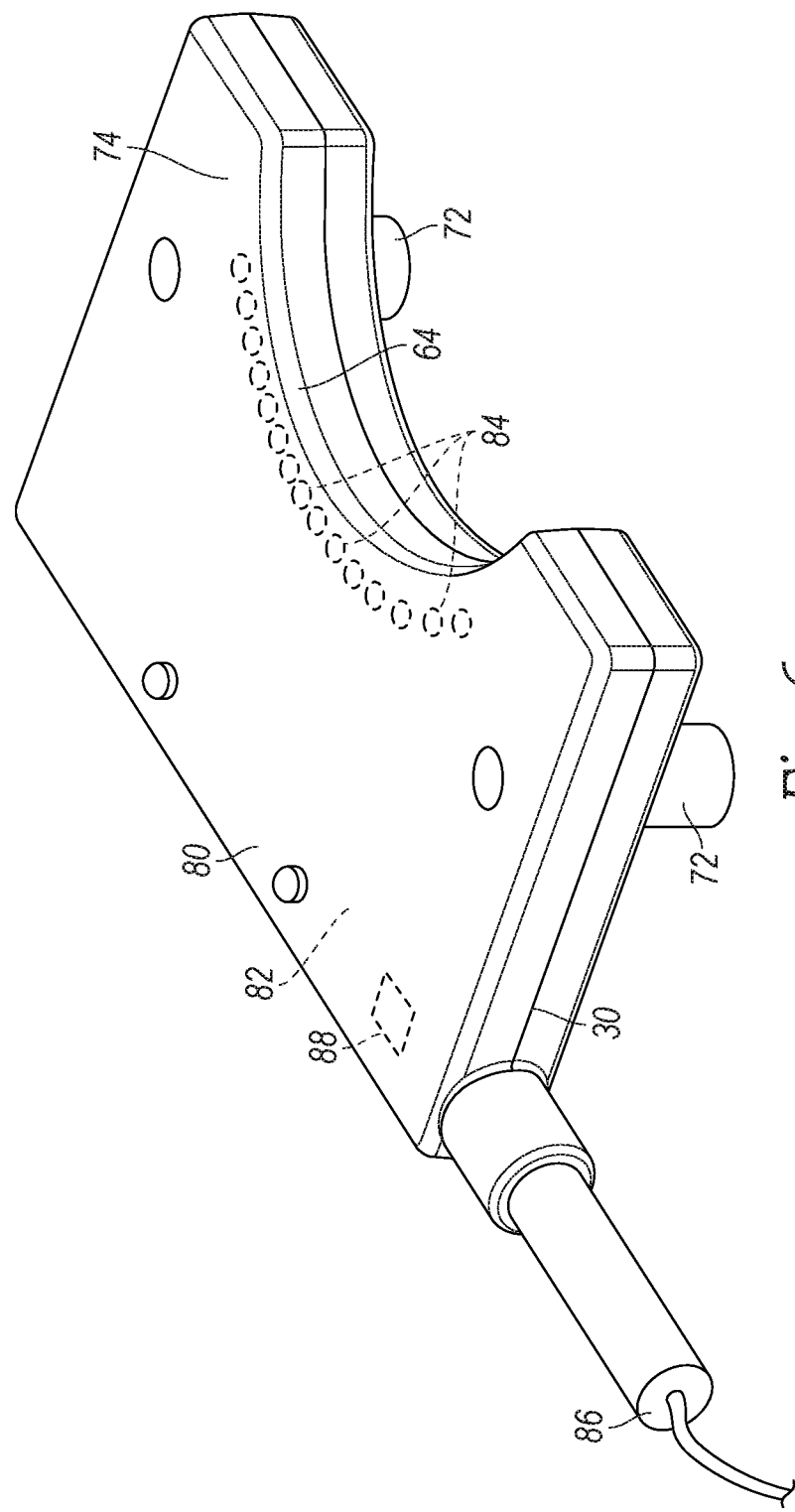
FIG. 6 is a top isometric view of an overmolded sensor array assembly of the position monitoring and control system shown removed from the assembly of FIG. 1.
Figure 7:
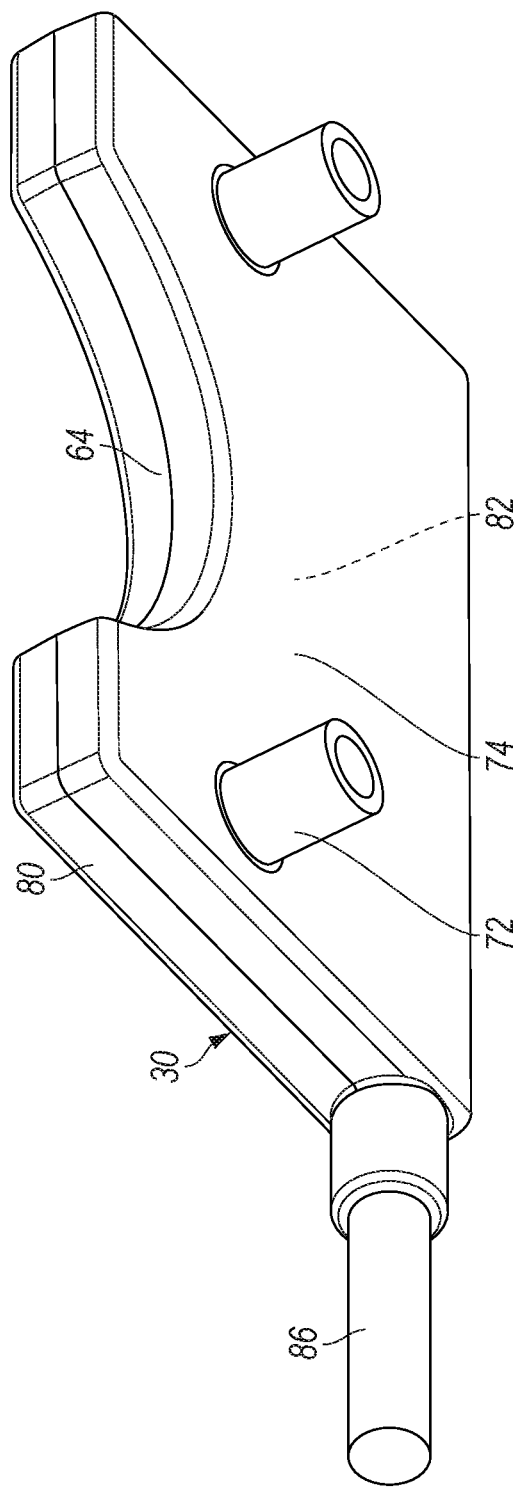
FIG. 7 is a bottom isometric view of the overmolded sensor array assembly of FIG. 6.

FIGS. 6 and 7 illustrate the sensor array assembly 30 shown removed from the mounting plate 66 and flow control valve 12. The sensor array assembly 30 is a generally planar structure with the standoffs 72 extending away from the assembly's bottom portion. The sensor array assembly 30 includes an overmolding layer 80 that encases a substrate, such as a printed circuit board 82, and a plurality of spaced apart sensors 84 positioned in an arcuate arrangement adjacent to the arcuate edge portion 64. In the illustrated embodiment, the sensors are Hall effect sensors or other suitable transducers or sensors.

The overmolding layer 80 of the illustrated embodiment is a plastic or other nonconductive material that protects the printed circuit board 82 (or other substrate) and the sensors 84 without substantively interfering with the magnetic flux from the magnet holder 44, as discussed in greater detail below. The sensor array assembly 30 also includes wires or other communication lines 86 at least partially enclosed in an overmolding and that operatively connect to the printed circuit board 82 and the associated sensors. The communication lines 86 are also operatively coupled to a controller 88 that receives signals or data from the sensors 84 during operation of the monitoring/control system 14 on the associated flow control valve 12.

Figure 8:
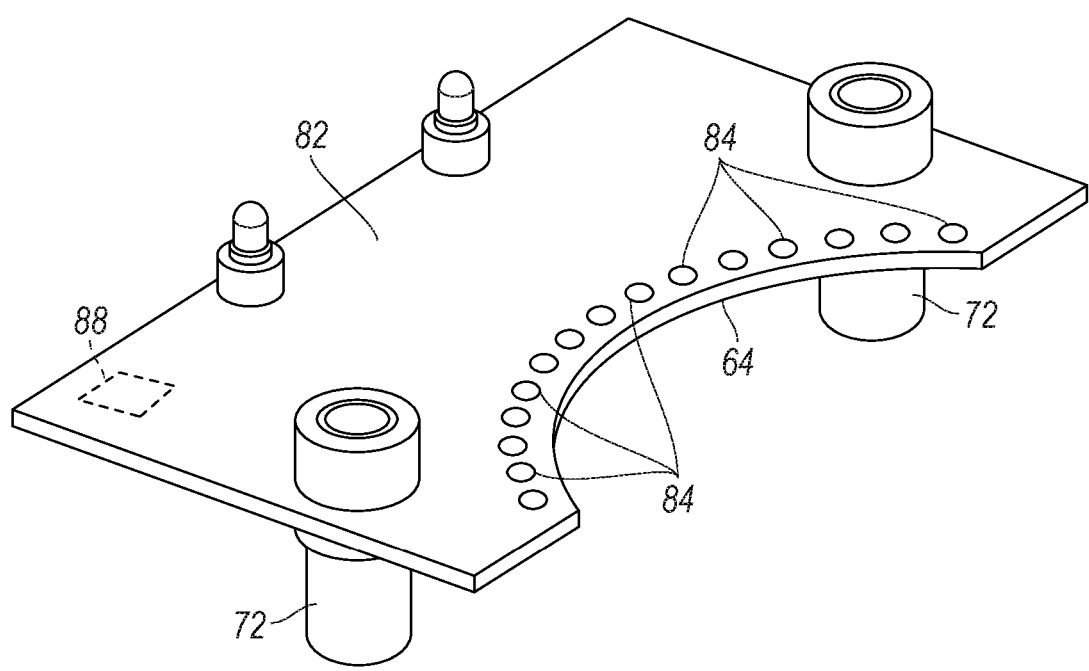
FIG. 8 is a top isometric view of the sensor array assembly of FIGS. 6 and 7 with the overmolding removed for purposes of illustration.
Figure 9:
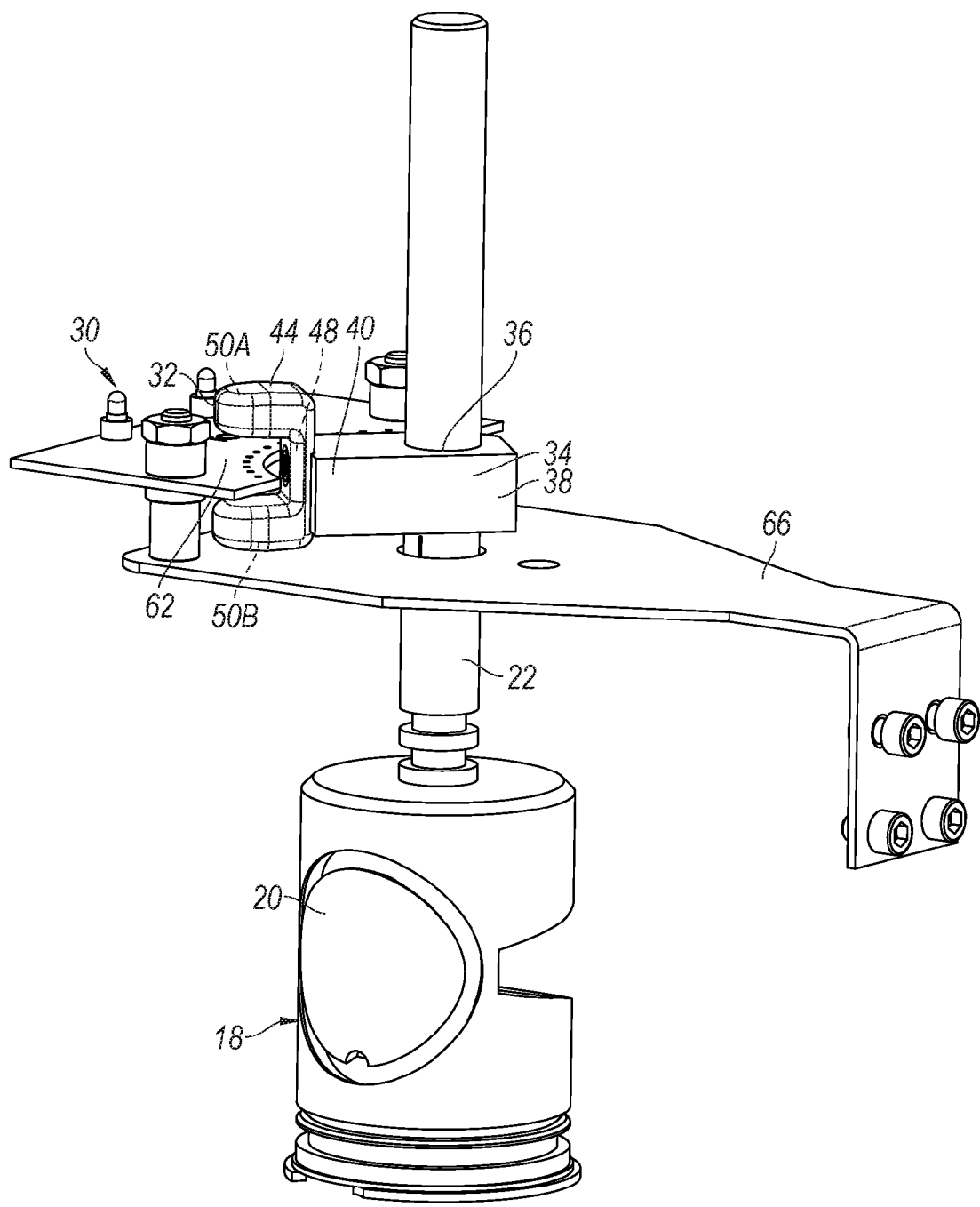
FIG. 9 is an isometric view of the position monitoring and control system of FIG. 2 with the overmolding removed from the sensor array assembly and showing the valve stem and valve body isolated from the valve housing of the valve assembly in FIG. 2.
Figure 10:
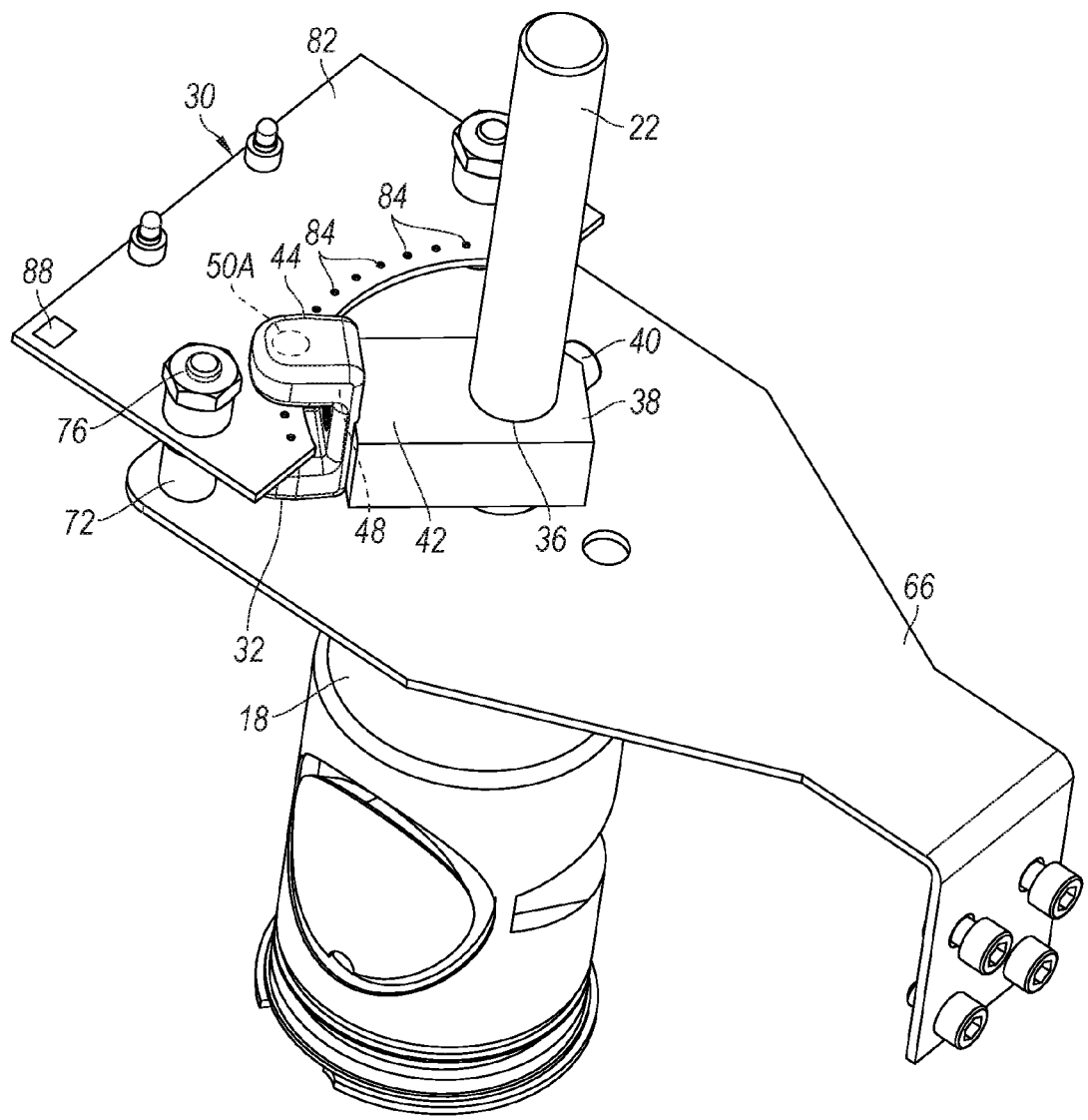
FIG. 10 is a top isometric view of the position monitoring and control system of FIG. 9 with a magnet support member connected to the valve stem and positioned adjacent to the sensor array assembly shown without the overmolding.

FIG. 8 is a top isometric view of the sensor array assembly 30 with the overmolding layer 80 removed for purposes of illustration. FIGS. 9 and 10 are isometric views showing the monitoring/control system 14 with the sensor array assembly 30 (sans the overmolding layer 80) relative to the valve member 18, which is shown removed from the flow control valve 12 for purposes of illustration. FIG. 11 is an isometric view similar to FIG. 10 with the overmolding layers 46 and 80 removed from the magnet holder 44 and sensor array assembly 30, respectively, for purposes of illustration. The sensors 84 (see FIGS. 8 and 10) are spaced apart from each other and mounted to the printed circuit board 82 in an arcuate pattern that corresponds to the arcuate path swept by the magnets 50A and 50B on the magnet holder 40 (See FIGS. 9 and 11) upon rotation of the valve 18 through a selected rotational range.

In the illustrated embodiment, the sensors 84 are transducers, such as Hall effect sensors, uniformly spaced apart from each other along the full length of the arcuate pattern. The illustrated sensor array assembly 30 is shown having fifteen (15) Hall effect sensors positioned along an arcuate path corresponding to approximately 90° of rotation of the valve stem 22 and the interconnected magnet holder 44. Other embodiments, however, can have more or fewer Hall effect sensors. A greater number of sensors 84 can be provided in the sensor array assembly 30 in close alignment with each other to provide for greater resolution of the monitoring/controlling system 14. The system 14 can, however, provide for accurate monitoring and control using only two spaced apart sensors 84 along a selected arcuate path corresponding to the arcuate movement of the magnet holder 44 and corresponding magnets 50A and 50B.

In other embodiments, the sensor array assembly 30 can have sensors disposed in an arcuate path that corresponds to radial movement of the valve stem 12 magnet holder 44 of greater or less than approximately 90°. For example, the sensor array assembly 30 can be configured in an embodiment having a plurality of sensors 84 disposed about a full 360° rotation path of the magnet holder 44. Other embodiments can be configured for an arcuate path of even greater than 360° rotation.

In the illustrated embodiment, the Hall effect sensors 84 are held in the fixed position relative to the housing, and the magnets move relative to the Hall effect sensors. In alternate embodiments, the magnets can be held in a fixed position relative to the housing and the sensors can be moved, such as rotationally with the valve member 18, to create the relative motion between the magnets and the sensors.

As seen in FIGS. 10-12, the sensor array assembly 30 and the magnet holder 44 are configured so that the concave arcuate edge portion 64 of the sensor array assembly 30 is positioned within the air gap 62 between the top and bottom leg portions 52 and 54 of the magnet holder 44. The sensors 84 are positioned on the printed circuit board 82 at or adjacent to the concave arcuate edge portion so that each sensor 84 is positioned between and in direct alignment with the upper and lower magnets 50A and 50B when the magnetic-field source 32 is in a corresponding portion of its arcuate path during rotation of the valve stem 22. In the illustrated embodiment, each sensor 84 is positioned so as to be substantially equidistant from the upper and lower magnets 50A and 50B when the magnets are positioned directly over and in axial alignment with the sensor. Accordingly, the plurality of sensors 84 define a plane parallel to the arcuate path of the magnets 50A and 50B through the range of rotational movement of the magnetic-field source 32.

The Hall effect sensors 84 of the illustrated embodiment are configured to detect the presence and strength of the magnetic flux from the magnets 50A and 50B when the U-Shaped magnet holder 44 is at least generally adjacent to two or more sensors (which corresponds to the valve stem's rotary position and the valve body's rotary position in the housing). Accordingly, the sensors 84 provide an output signal to a controller 88 via circuitry and/or communication lines corresponding to the detected magnetic flux or field as the magnets 50A and 50B move along the arcuate path or are stopped at a selected location relative to the arcuate path. In one embodiment, the controller 88 is a microcontroller that can reside on the printed circuit board 82. In other embodiments, the controller 88 can be remote from the printed circuit board 82 and operatively connected to the sensors 84 via the communication lines 86. In yet another embodiment, the printed circuit board may be replaced by a selected substrate that supports the sensors, and the operative circuitry and/or controller can be remote from the overmolded substrate and sensors. The controller 88 can also be operatively coupled to the flow control valve 12 to cause precise adjustment of the valve member 18 relative to the housing 16, thereby precisely controlling the flow of fluid through the flow control valve 12.

The output signals from the Hall effect transducers/sensors 84 are used to determine the precise radial location of the magnets 50A and 50B. The control valve assembly and the monitoring/control system 14 are calibrated so that the information regarding the precise location of the magnets 50A and 50B relative to the sensors can be used to determine the precise rotational position of the magnetic-field source 32, the rotational position of the valve member 18, and/or the precise flow rate of fluid through the control valve assembly 10. In at least one embodiment, the output signals of the transducers in the sensor array are measured and the position is found in the following equation:

$$\text{Magnet Position} = (tO_1 * tL_1 + tO_2 * tL_2 + tO_3 * tL_3 + \ldots) / (tO_1 + tO_2 + tO_3 + \ldots)$$

Wherein:

"$tO_N$"=each transducer output;

"$tL_N$"=each transducers position; and

N=the number associated with each transducer. The transducers are sequentially numbered beginning with number "1" corresponding to the first transducer at one end of the array of transducers. In the illustrated embodiment having 15 transducers, the first transducer at the starting end is N=1, and the last transducer (opposite the N=1 transducer) is N=15.

Figure 13:
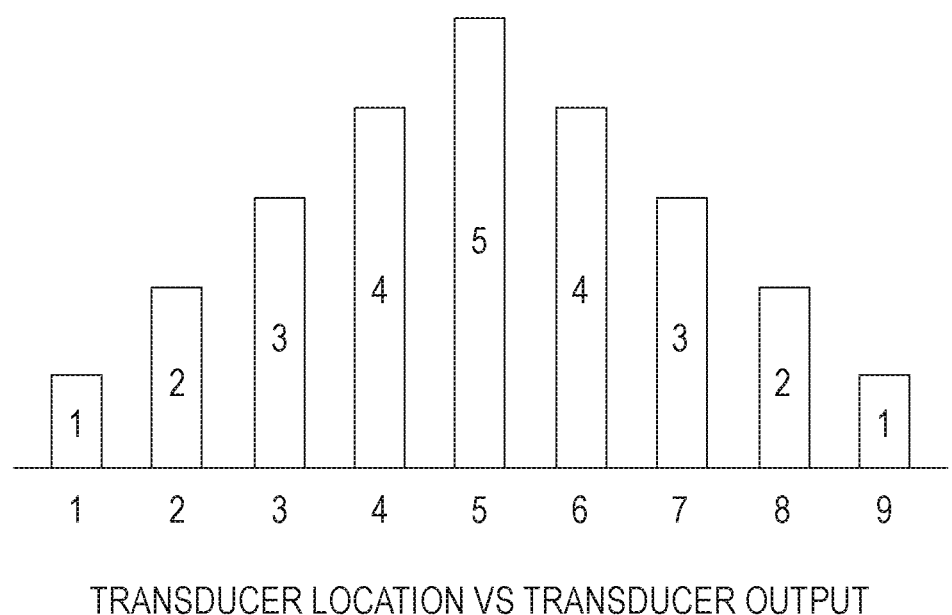
FIG. 13 is a schematic chart indicating a transducer location as a function of tranducer output.

The Hall effect sensors 84 of the illustrated embodiment are arranged in the predefined path with known spacing between adjacent Hall effect sensors or other transducer. The Hall effect sensors 84 may be bipolar or uni-polar sensors, and they may provide analog or digital output. In the illustrated embodiment, the sensor array assembly has at least two Hall effect sensors 84 or other transducers or sensors. When the magnets 50A and 50B are directly aligned (i.e., coaxially aligned) with a sensor, such as Sensor No. 5 as illustrated in the chart of FIG. 13, the output from Sensor No. 5 is largest (corresponding to the transducer's position or alignment relative to the magnetic flux). The other Hall effect sensors 84 adjacent to the sensor closest to the magnets 50A and 50B (e.g., Sensor No. 5) are also affected by the magnetic flux, but to a lesser degree, which results in lower and/or decreasing output values of the sensors 84 as a function of their distance from the activated sensor (e.g., Sensor No. 5) and the magnets. Accordingly, referring to FIG. 13, the outputs from Sensor Nos. 4 and 6 on opposite sides of Sensor No. 5 are reduced because of the increased distance from the magnets 50A and 50B, and the outputs from Sensor Nos. 3 and 7, and Sensor Nos. 2 and 8, and Sensor Nos. 1 and 9, are proportionally reduced because of the respective increased distances between the sensors and the magnets.

The microcontroller 88 of the calibrated system 14 will read the outputs of the array of sensors 84 and will compute the position of the magnetic source along the path with the above equitation. In one embodiment, the position output from the sensors 84 can be further enhanced by providing in the microcontroller a lookup table of calculated magnetic positions using the above equation as a function of the actual position recorded during calibration of the system, such as on an external calibration fixture. The system can be configured, with or without the lookup table, so that the calculated magnetic position can represent any one of a variety of outputs, such as angle, distance, and/or percentage. In some embodiments, multiple outputs could be correlated to the magnetic position relative to the sensors.

This calibrated off-axis monitoring and control system 14 of the illustrated embodiments allows for precise control of the flow valve 12 and the associated fluid flow rate therethrough. The system 14 could be used in connection with other systems for precisely determining the position of one component that is movable relative to another component (e.g., a fixed component). Also, the movement is discussed above as rotational/radial movement relative to a known path, which may be a fix and finite path. Alternate embodiments can provide the system configured for relative linear movement between the components along a known path.

From the foregoing, it will be appreciated that specific embodiments of the present technology have been described herein for purposes of illustration, but that various modifications may be made without deviating from the disclosure. In addition, certain aspects of the disclosure described in the context of particular embodiments may be combined or eliminated in other embodiments. Further, while advantages associated with certain embodiments have been described in the context of those embodiments, other embodiments may also exhibit such advantages. Not all embodiments need necessarily exhibit such advantages to fall within the scope of the present disclosure. Accordingly, the disclosure and associated technology can encompass other embodiments not expressly shown or described herein.

I claim:

1. A control valve assembly, comprising:
   a valve housing;
   a valve member in the valve housing and being rotationally moveable about an axis of rotation relative to the valve housing between a plurality of rotary positions of the valve member, the valve member having a valve stem extending from the valve housing;
   a valve-position monitor coupled to the valve member and configured to determine valve conditions related to rotary positions of the valve member, the valve-position monitor comprising:
      a monitoring array having a plurality of coplanar transducers in a shaped arrangement relative to the axis of rotation and spaced radially apart from the valve stem, the transducers being in a fixed, non-moveable position relative to the valve housing;
      a magnetic-field source connected to the valve member and rotatable with the valve stem as a unit, the magnetic-field source comprising spaced apart magnetic members adjacent to opposing sides of the monitoring array and spaced apart a fixed distance from a plane of the transducers, the magnetic members being moveable adjacent to the opposing sides of the monitoring array and along a path parallel to the shaped arrangement of the transducers as the valve member rotates through the plurality of rotary positions, wherein the magnetic-field source provides magnetic flux detectable by at least a plurality of the transducers to determine at least one of the rotational positions of the magnetic-field source, the rotational position of the valve member, and a rate of flow through the control valve assembly.

2. The valve assembly of claim 1 wherein the monitoring array has a support plate connected to the housing, the monitoring array is attached to the support plate and supported apart from the valve housing.

3. The valve assembly of claim 1 wherein the transducers are arranged along an arcuate path, and wherein each transducer is an equal distance from the axis of rotation.

4. The valve assembly of claim 1 wherein the monitoring array comprises the plurality of transducers carried by a support member and an overmolding portion that encapsulates the transducers and at least a portion of the support member.

5. The valve assembly of claim 1 wherein the magnetic members comprise first and second magnetic field members spaced apart from each other in a direction parallel to the axis of rotation, and wherein the magnetic-field source is positionable so at least one transducer is positioned between the first and second magnetic field members.

6. The valve member of claim 1 wherein the magnetic-field source includes a Ferrous-based member with a first magnetic member on a first leg extending radially away from the axis of rotation and a second magnetic member on a second leg extending radially away from the axis of rotation and aligned with the first magnetic member in a direction normal to the first and second legs with at least a portion of the transducer array assembly positioned between the first and second magnetic members.

7. The valve member of claim 1 wherein the magnetic field source is at least partially encased in a non-conductive overmold portion and positioned so the transducers will move between the magnetic members as the valve member moves through the plurality of rotary positions.

8. The valve member of claim 1 wherein the transducers are Hall effect sensors.

9. The valve member of claim 1 wherein the transducers of the monitoring array are coplanar and supported on a substrate, and the transducers and substrate are encased in a non-conductive overmolding portion.

10. A control valve assembly, comprising:
a valve housing;
a valve member rotatably carried by the housing and being rotationally moveable about an axis of rotation between a plurality of rotary positions of the valve member;
a valve-position monitoring and control system coupled to the valve member and comprising:
a first portion coupled to the valve housing and being in a fixed, non-moveable position relative to the valve housing; and
a second portion spaced apart from the first portion and connected to the valve member, wherein the second portion is rotatable with the valve member as a unit about the axis of rotation;
wherein a first one of the first and second portions comprises a transducer array assembly having a plurality of spaced apart transducers positioned in a planar arrangement spaced apart from the valve member; and
wherein a second one of the first and second control portions comprises a magnetic-field source having spaced apart magnetic members immediately adjacent to opposing sides of the transducer array assembly and spaced apart a fixed distance from a plane of the transducers, the magnetic members being moveable as a unit adjacent to the opposing sides of the transducer array and along a path parallel to the transducers as the valve member rotates about the axis of rotation, wherein the magnetic-field source provides magnetic flux detectable by at least a plurality of the transducers to precisely determine at least one of the rotational position of the magnetic-field source, the rotational position of the valve member, and a rate of flow through the control valve assembly.

11. The valve assembly of claim 10 wherein the valve-position monitoring and control system has a support plate connected to the housing, and the transducer array assembly is attached to the support plate and is supported apart from the valve housing.

12. The valve assembly of claim 10 wherein the transducer array assembly comprises the plurality of transducers carried by a support member and an overmolding portion that encapsulates the transducers and at least a portion of the support member.

13. The valve assembly of claim 10 wherein the magnetic members comprise first and second magnetic members spaced apart from each other in a direction parallel to the axis of rotation, and wherein the magnetic-field source is positionable so at least one transducer is positioned between the first and second magnetic members.

14. The valve member of claim 10 wherein the magnetic-field source is a Ferrous-based member with a first magnetic member on a first leg extending radially away from the axis of rotation and a second magnetic member on a second leg extending radially away from the axis of rotation and aligned with the first magnetic member with at least a portion of the transducer array assembly between the first and second magnetic members.

15. The valve member of claim 10 wherein the magnetic-field source is at least partially encased in a non-conductive overmold portion and positioned so the transducers will move between the magnetic members as the valve member moves through the plurality of rotary positions.

16. The valve member of claim 10 further comprising a controller operatively connected to the transducer array and configured to receive signals from the transducers related to the magnetic flux detected by one or more transducers, wherein the signals are useable to precisely determine the rate of flow through the control valve assembly.

17. The valve member of claim 7 wherein the overmolding portion is a first overmolding portion, and wherein the transducers of the monitoring array are coplanar and supported on a substrate, and the transducers and substrate are encased in a non-conductive second overmolding portion physically separate from the first overmolding portion.

18. An off-axis position monitoring and control system usable with a control valve assembly having a first valve portion and a second valve portion rotatable about an axis of rotation and relative to the first valve portion, wherein the second valve portion is rotatable between a plurality of rotary positions, the position monitoring and control system comprising:
a transducer array assembly having a plurality of coplanar, spaced apart transducers arranged about the axis of rotation and spaced from the second valve member and being in a fixed, non-moveable position relative to the first valve portion;
a magnetic-field source connected to the second valve portion and rotatable as a unit with the second valve portion, the magnetic-field source comprising magnetic members adjacent to opposing sides of the array assembly and spaced apart a fixed distance from a plane of the transducers, the magnetic members being moveable adjacent to the opposing sides of the array assembly and along a path parallel to the transducers as the valve member rotates through the plurality of rotary positions, wherein the magnetic-field source provides magnetic flux detectable by at least a plurality of the transducers to determine at least one of the rotational positions of the magnetic-field source, the rotational position of the valve member, and a rate of flow through the control valve assembly, wherein the magnetic members include first and second magnetic field members spaced apart from each other in a direction parallel to the axis of rotation, and wherein the magnetic-field source is positionable so at least one transducer is positioned between the first and second magnetic field members.

19. The position monitoring and control system of claim 18, wherein the magnetic-field source includes a Ferrous-based member with a first magnetic member on a first leg extending radially away from the axis of rotation and a second magnetic member on a second leg extending radially away from the axis of rotation and aligned with the first magnetic member in a direction normal to the first and second legs with at least a portion of the transducer array assembly positioned between the first and second magnetic members.

20. The valve member of claim 15 wherein the overmolding portion is a first overmolding portion, and wherein the transducers of the monitoring array are coplanar and supported on a substrate, and the transducers and substrate are encased in a non-conductive second overmolding portion physically separate from the first overmolding portion.

* * * * *